(12) United States Patent
Taylor et al.

(10) Patent No.: US 11,536,330 B2
(45) Date of Patent: Dec. 27, 2022

(54) CALIPER GUIDE ASSEMBLY

(71) Applicant: Meritor Heavy Vehicle Braking Systems (UK) Limited, Cwmbran (GB)

(72) Inventors: Martin Taylor, Cwmbran (GB); Sean Cleary, Cwmbran (GB); Matthew McGinn, Cwmbran (GB); Sanjeev Kulkarni, Cwmbran (GB); Vadiraj Pavaman, Cwmbran (GB)

(73) Assignee: Meritor Heavy Vehicle Braking Systems (UK) Limited, Cwmbran (GB)

(*) Notice: Subject to any disclaimer, the term of this patent is extended or adjusted under 35 U.S.C. 154(b) by 117 days.

(21) Appl. No.: 17/170,526

(22) Filed: Feb. 8, 2021

(65) Prior Publication Data

US 2021/0270334 A1   Sep. 2, 2021

(30) Foreign Application Priority Data

Feb. 28, 2020 (EP) .................................... 20160272

(51) Int. Cl.
*F16D 55/2265* (2006.01)
*B60T 1/06* (2006.01)
(Continued)

(52) U.S. Cl.
CPC ........ *F16D 55/22655* (2013.01); *B60T 1/065* (2013.01); *B60T 17/22* (2013.01);
(Continued)

(58) Field of Classification Search
CPC ............. F16D 55/22655; F16D 55/227; F16D 65/005; F16D 65/0087; F16D 2055/007;
(Continued)

(56) References Cited

U.S. PATENT DOCUMENTS 4,280,594 A * 7/1981 Baum .................... F16D 66/025
188/1.11 W
5,087,907 A * 2/1992 Weiler .................. F16D 66/026
200/61.4
(Continued)

FOREIGN PATENT DOCUMENTS

CN    109838481 A    6/2019
DE    3921294 A1    1/1991
(Continued)

OTHER PUBLICATIONS

Extended European Search Report dated Aug. 14, 2020 for related European Appln. No. 20160272.9; 7 Pages.
(Continued)

*Primary Examiner* — Thomas W Irvin
(74) *Attorney, Agent, or Firm* — Brooks Kushman PC (57) ABSTRACT

A caliper guide assembly having a guide pin, a guide bore, a cap, and a sensor arrangement. The guide bore is arranged to receive the guide pin. The cap may be secured to an open end of the guide bore proximate a free end of the guide pin. The sensor arrangement may include a first sensor component that is configured to provide an output indicative of relative axial displacement between a first sensor component and a second sensor component.

15 Claims, 4 Drawing Sheets

(51) Int. Cl.
  *B60T 17/22* (2006.01)
  *F16D 55/227* (2006.01)
  *F16D 65/00* (2006.01)
  *F16D 55/00* (2006.01)

(52) U.S. Cl.
  CPC ......... *F16D 55/227* (2013.01); *F16D 65/005* (2013.01); *F16D 65/0087* (2013.01); *F16D 2055/0004* (2013.01); *F16D 2055/007* (2013.01)

(58) Field of Classification Search
  CPC ...... F16D 66/02; F16D 66/022; F16D 66/023; F16D 66/025
  See application file for complete search history.

(56) References Cited

U.S. PATENT DOCUMENTS

| | | | | |
|---|---|---|---|---|
| 5,632,359 | A * | 5/1997 | Camps | F16D 55/22655 188/1.11 R |
| 6,272,914 | B1 * | 8/2001 | Ciotti | F16D 66/025 188/11 |
| 6,481,539 | B1 * | 11/2002 | Shaw | F16D 66/025 188/1.11 E |
| 7,322,447 | B2 * | 1/2008 | Deckhut | F16D 66/02 188/79.51 |
| 8,051,958 | B1 * | 11/2011 | Rockwell | F16D 55/227 188/73.45 |
| 9,279,468 | B1 * | 3/2016 | Philpott | F16D 66/021 |
| 9,618,067 | B2 * | 4/2017 | Philpott | F16D 65/38 |
| 9,845,837 | B2 * | 12/2017 | Thomas | B23B 49/02 |
| 10,233,984 | B2 * | 3/2019 | Evans, Jr | F16D 66/021 |
| 11,313,423 | B2 * | 4/2022 | Taylor | F16D 66/025 |
| 2009/0200122 | A1 * | 8/2009 | Bagge | F16D 65/0012 384/192 |
| 2014/0353094 | A1 | 12/2014 | Welin | |
| 2015/0323022 | A1 * | 11/2015 | Thomas | F16D 55/22655 408/1 R |
| 2016/0356325 | A1 * | 12/2016 | Knoop | F16D 65/0087 |
| 2018/0080510 | A1 * | 3/2018 | Thomas | B23B 41/00 |
| 2019/0162256 | A1 * | 5/2019 | Taylor | F16D 66/025 |
| 2019/0195299 | A1 * | 6/2019 | Knoop | F16D 55/227 |
| 2021/0025464 | A1 * | 1/2021 | Taylor | F16D 55/227 |

FOREIGN PATENT DOCUMENTS

| | | |
|---|---|---|
| DE | 102012006105 A1 | 9/2013 |
| DE | 102015104892 A1 | 10/2016 |
| EP | 2520817 A1 | 11/2012 |
| EP | 2708771 A1 | 3/2014 |
| EP | 3492768 A1 | 6/2019 |

OTHER PUBLICATIONS

First Office Action for Chinese Application No. 202110113355.1, dated Aug. 3, 2022, 6 Pages.

* cited by examiner

CALIPER GUIDE ASSEMBLY

TECHNICAL FIELD

The present teachings relate to a disc brake and particularly but not exclusively to a guide assembly for slidably mounting a caliper of a disc brake, and incorporating a wear sensor.

BACKGROUND

Disc brakes are commonly used for braking heavy vehicles such as trucks, buses and coaches.

Disc brakes conventionally comprise a brake carrier and a caliper. The brake carrier is arranged to carry brake pads on each side of a rotor. The caliper is slidably mounted on the brake carrier by two or more guide assemblies, such that when the disc brake is actuated, the caliper is able to slide with respect to the brake carrier so that both brake pads are urged onto a rotor in a clamping action to effect braking.

A guide assembly typically comprises a guide pin along which the caliper can slide and a bore disposed in the caliper for receiving the guide pin.

To achieve free sliding of the caliper in a broad range of operating conditions, the guide assemblies must take account of manufacturing tolerances, effects of heating or cooling in use, and accommodate deflections of the disc brake due to the braking torque.

In addition, it is desirable for the vehicle operator to be provided with the wear status of the brake pad friction material in order to be notified when brake pads are to be changed, to maintain safe operation of the disc brake. However, known wear sensing arrangements may be costly and can restrict the design of other parts of the brake. Further, known arrangements may be susceptible to environmental contamination and damage. Further, known sensing arrangements can be bulky and may increase the size of elements of the caliper guide assembly.

The present teachings seek to overcome, or at least mitigate the problems of the prior art.

SUMMARY

According to a first aspect of the present teachings there is provided a caliper guide assembly for a heavy vehicle disc brake. The caliper guide assembly comprises: a guide pin having a cavity at a free end thereof; a guide bore arranged to receive the guide pin and permit relative axial sliding thereof; a cap secured to an open end of the guide bore that is proximate the free end of the guide pin; and a sensor arrangement including a first sensor component radially spaced from a second sensor component, the first sensor component secured to the guide pin such that it is at least partially located within the cavity, the second sensor component secured to the cap such that it is located within the guide bore and is axially spaced from the open end of the guide bore, wherein the sensor arrangement is configured to provide an output indicative of a relative axial displacement between the first sensor component and the second sensor component.

Advantageously, this provides a compact brake wear sensor arrangement that is housed within a guide bore of a caliper guide assembly. Thus, additional sensor components are not required to be provided external to the guide bore, saving space within the caliper guide assembly.

Further, by locating the brake wear sensor arrangement within the guide bore and between the cap and the free end of the guide pin, the sensor arrangement is protected from environmental contaminations that may damage the sensor components.

The caliper guide assembly may further comprise a protective housing secured to the guide pin and at least partially located within the cavity. The protective housing may comprise a void having an axial depth within which the first sensor component may be at least partially located.

The protective housing protects the first sensor component from incurring damage from other components within the guide bore, as well as helping to prevent environmental contaminations from damaging the first sensor component.

The first sensor component may be secured to the protective housing.

The protective housing may comprise a base. The void may be at least partially defined by the base. The first sensor component may be secured to and extend from the base.

Advantageously, this allows the protective housing to provide a mounting platform for securing the first sensor component to the guide pin.

The protective housing may comprise an axially extending protective wall. The void may be at least partially defined by the protective wall.

Advantageously, the protective wall provides protection to the sensor components located within the void in the protective housing.

The first sensor component may have an axial length substantially equal to the axial depth of the void.

This maximizes the relative axial displacement that may be sensed whilst also helping to ensure that the first sensor component is protected by the protective housing.

The cap may comprise a shaft extending axially into the guide bore. The shaft may have an end portion having a free end. The second sensor component may be located on the shaft, preferably proximate the free end thereof.

The shaft allows the second sensor component to be sufficiently axially spaced from the open end of the guide bore to sense the full range of relative axial displacement between the first and second sensor components.

The shaft may have an axial length greater than or equal to the axial depth of the void.

This maximizes the relative axial displacement that may be sensed.

The cap may comprise a guide wall and an end wall. The guide wall may extend axially from the end wall into the guide bore. The guide wall may be at least partially adjacent an inner surface of the guide pin adjacent the cavity.

The overlap of the guide wall and the inner surface of the guide pin provides protection to the sensor components.

The guide wall, the end wall and the inner surface of the guide pin adjacent the cavity may at least partially define an enclosed space within which the first and second sensor components may be wholly contained.

The protective housing, the end wall and the guide wall may at least partially define an enclosed space within which the first and second sensor components may be wholly contained.

The enclosed space helps to prevent environmental contaminants from damaging the first and second sensor components.

The guide wall may be at least partially located between the protective housing and the inner surface of the guide pin adjacent the cavity.

The guide wall helps to ensure that the protective housing maintains its orientation with respect to the guide bore when the guide pin slides axially relative to the guide bore. In turn, this helps to ensure that the first sensor component maintains its radial spacing in relation to the second sensor component.

The first and second sensor components may be located substantially centrally with respect to the guide bore.

This may help to ensure that the first and second sensor components are located away from other components within the guide bore/guide pin, and hence prevent damage from occurring to the sensor components.

The first sensor component may be a metallic or magnetic element and the second sensor component may be a Hall Effect type sensor.

According to a second aspect of the present teachings, there is provided a heavy vehicle disk brake comprising a caliper guide assembly according to the first aspect.

BRIEF DESCRIPTION OF THE DRAWINGS

Embodiments are now disclosed by way of example only with reference to the drawings, in which.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
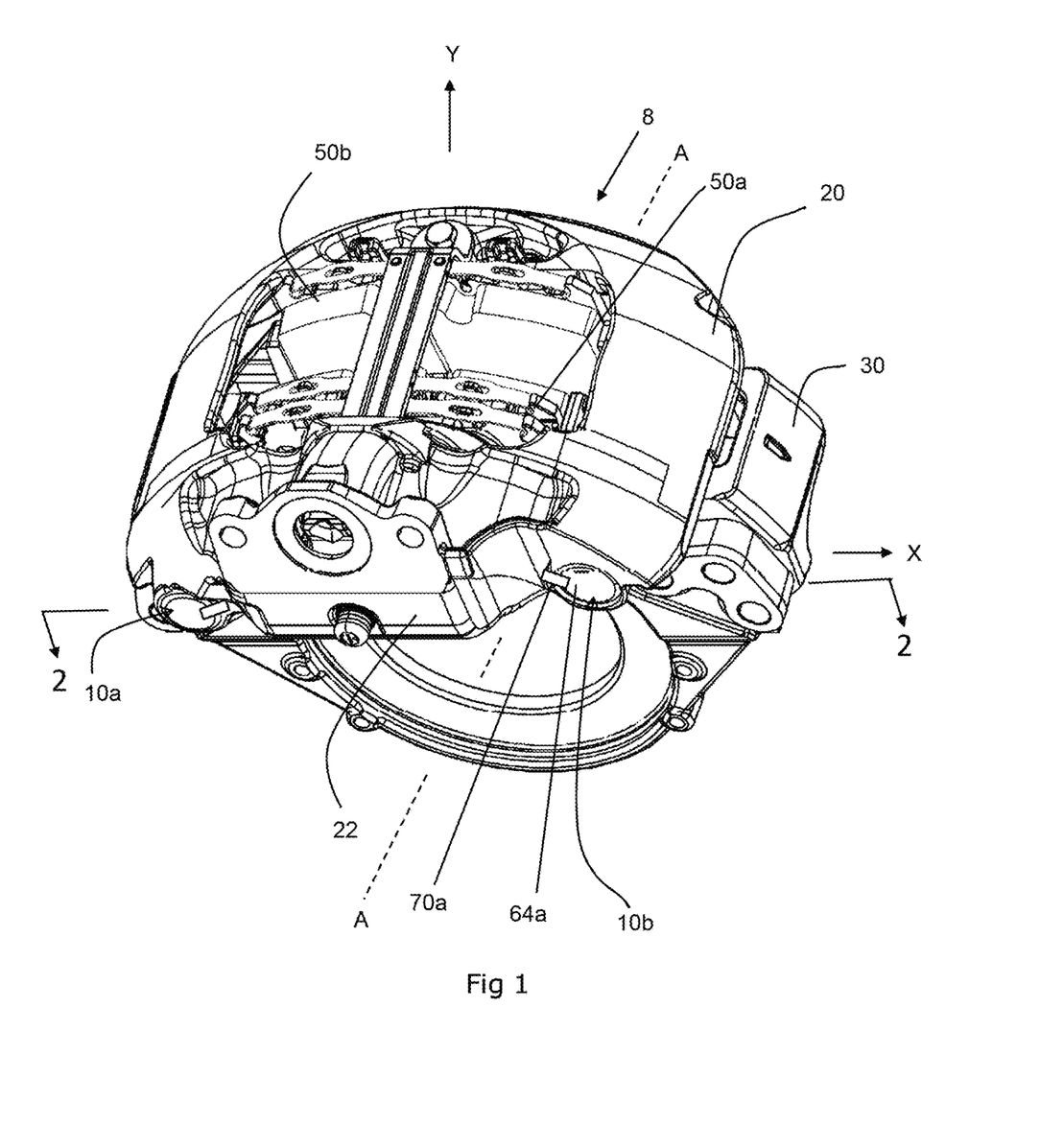
FIG. 1 is an isometric view of a heavy vehicle disk brake according to an aspect of the teachings.

FIG. 1 depicts an embodiment of a disc brake 8. The disc brake comprises a caliper 20 slidably mounted with respect to a brake carrier 30 by two guide assemblies 10a and 10b. The caliper 20 has a housing 22 typically formed from cast iron or steel. The carrier 30 is typically also formed from cast iron or steel.

The brake carrier 30 carries an inboard brake pad 50a and an outboard brake pad 50b. A rotor 40 (see FIG. 2), rotatable about an axis extending in the axial direction A-A, is positioned between the brake pads. An air actuator (not shown) is provided to move the inboard brake pad 50a into frictional contact with the rotor via an actuation mechanism 41 (see FIG. 2) housed within the caliper housing 22 and which acts on the inboard brake pad 50a. When the inboard brake pad 50a is pushed towards and contacts the rotor, the caliper 20 is then caused to slide inboard along first and second caliper guide assemblies 10a and 10b.

Figure 2:
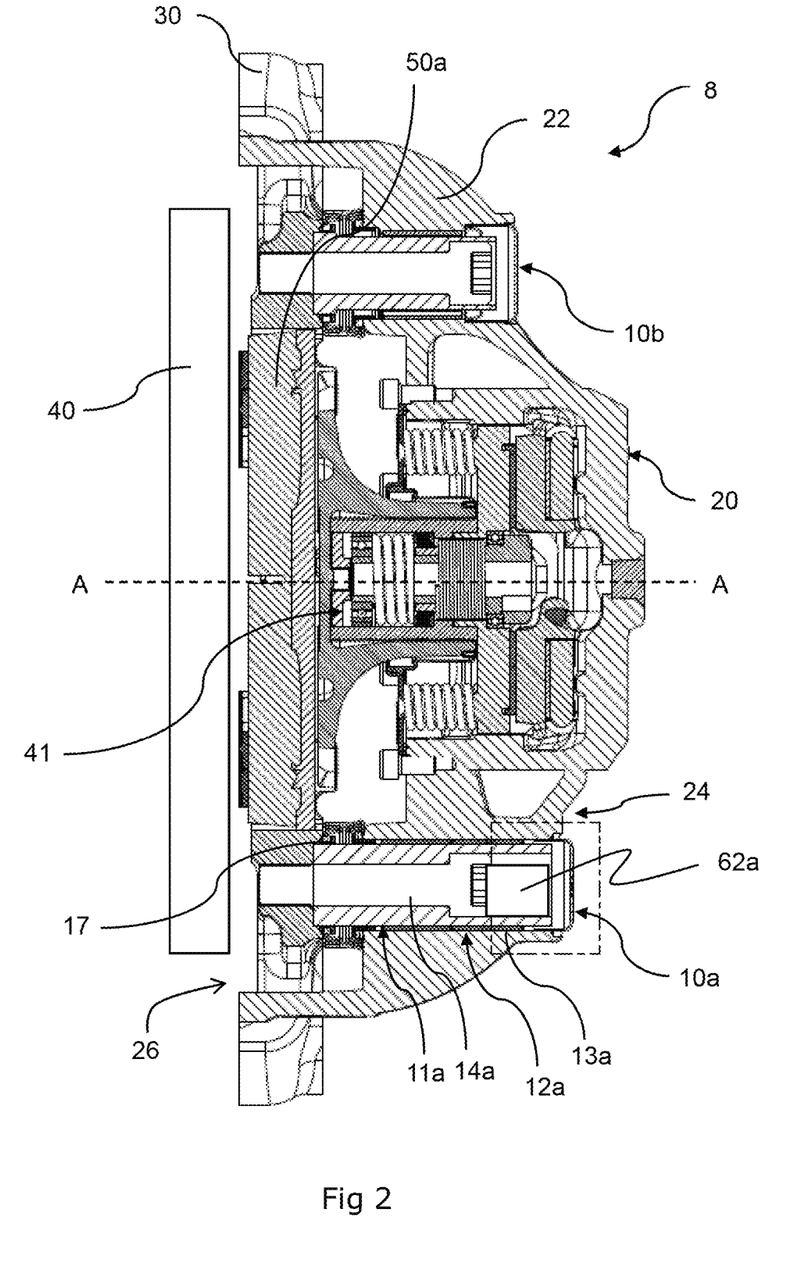
FIG. 2 is a partial cross-section through the heavy vehicle disc brake of FIG. 1 on the plane 2-2 showing a caliper guide assembly according to an aspect of the teachings.

As the caliper 20 slides inboard it moves the outboard brake pad 50b towards the rotor 40. Hence, the rotor 40 becomes clamped between the inboard and outboard brake pads and the rotation of the rotor is frictionally inhibited.

The second guide assembly 10b is a conventional guide assembly known in the art. It can be seen in FIG. 2 that the first guide assembly 10a is longer than the second guide assembly 10b.

Figure 3:
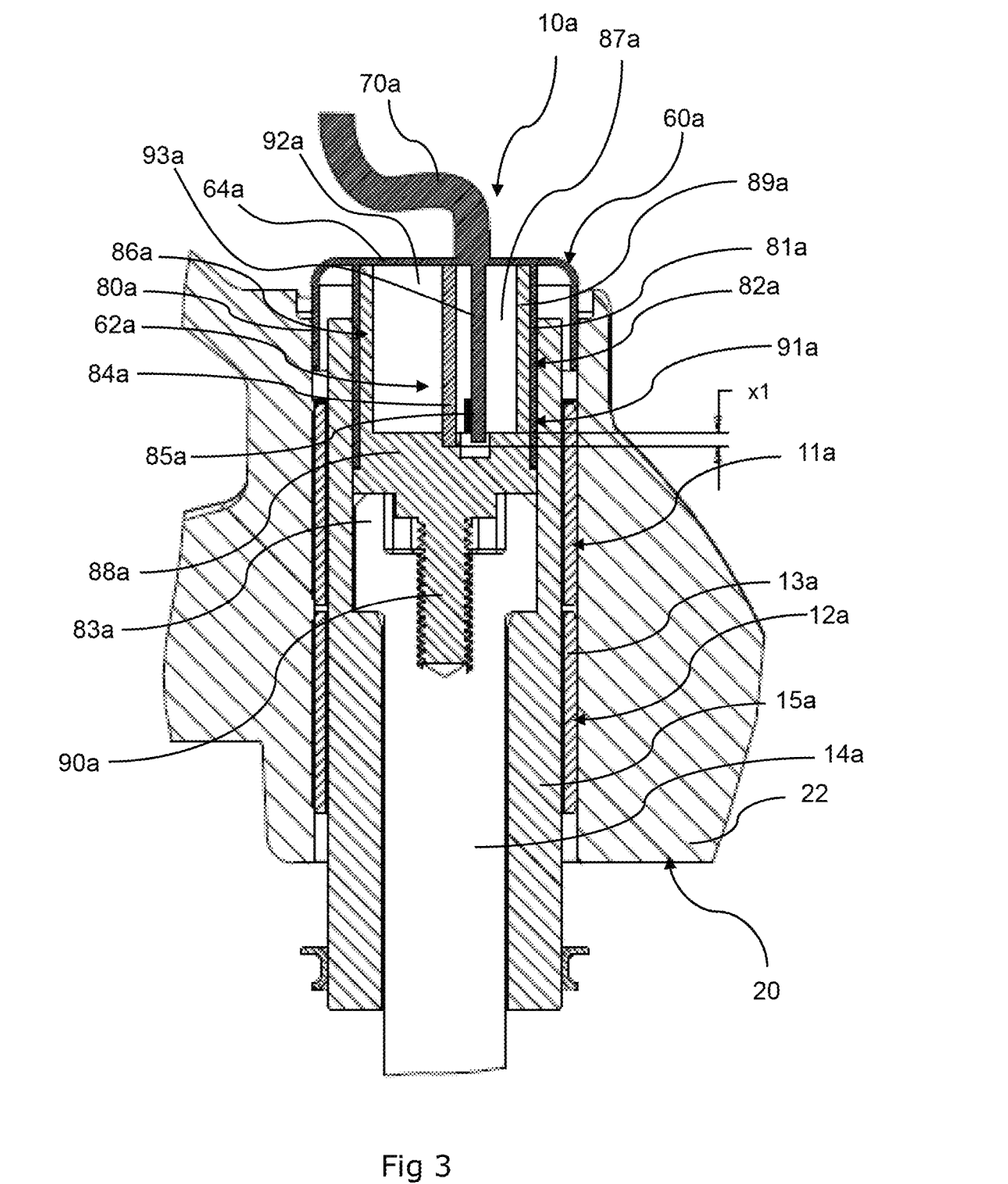
FIG. 3 is a section view of the caliper guide assembly of FIG. 2 in a first configuration.
Figure 4:
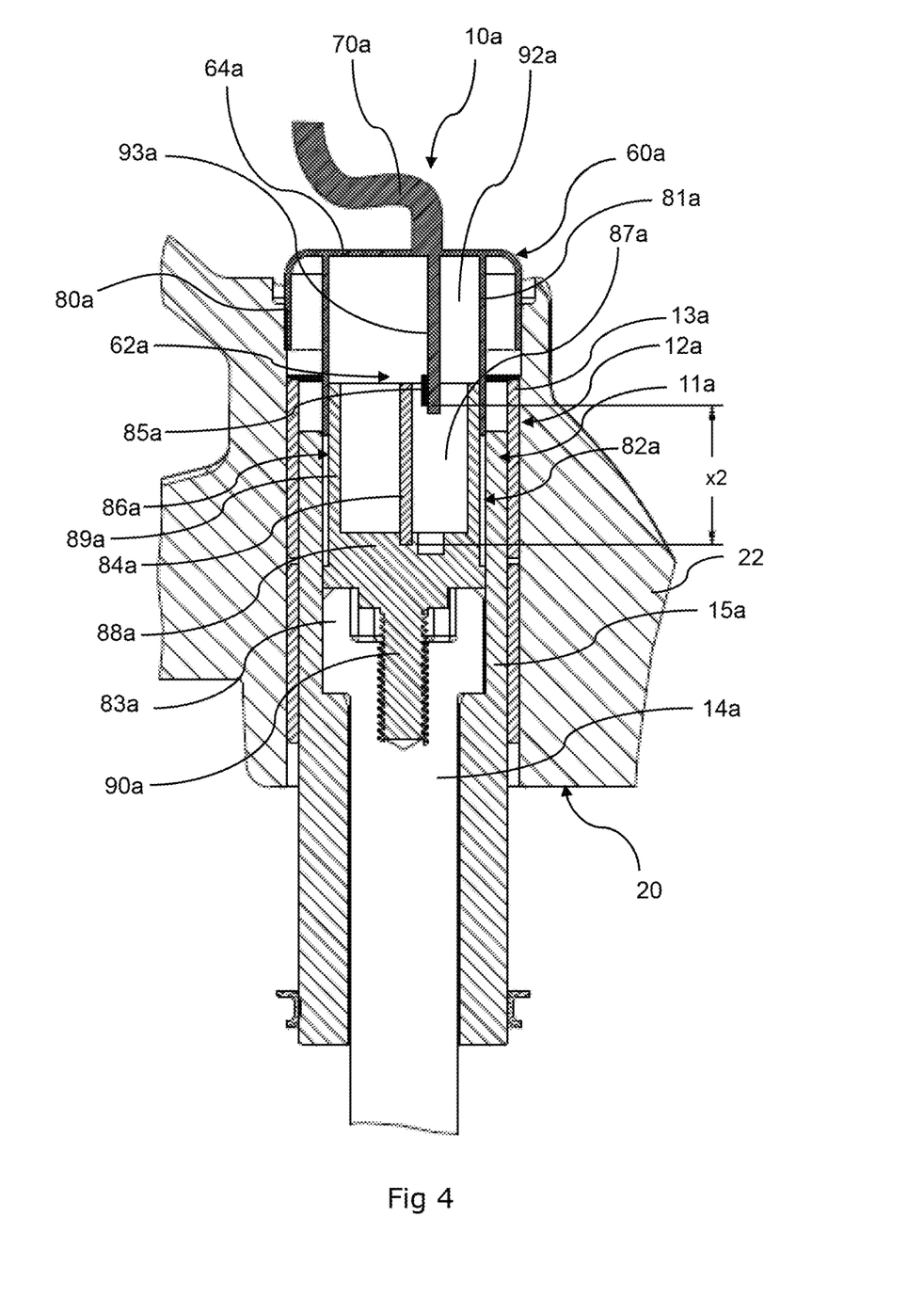
FIG. 4 is a section view of the caliper guide assembly of FIG. 2 in a second configuration.

With reference to FIGS. 2 to 4, the first guide assembly 10a comprises a bore 12a extending parallel to axis A-A through the housing 22. Hereinafter, any direction which is parallel to axis A-A shall be referred to as the axial direction. The bore 12a has a circular cross-sectional profile to receive a guide pin 11a and at least one guide bush 13a with a circular outer profile to guide the guide pin 11a within the bore 12a.

The guide pin 11a comprises a fastener 14a to secure the guide pin 11a to the brake carrier 30. In the illustrated embodiment, the fastener 14a is a bolt that affixes to the brake carrier 30 by screwing into a threaded bore in the brake carrier 30.

With particular reference to FIGS. 3 and 4, the guide pin 11a further comprises a guide sleeve 15a at least substantially surrounding the fastener and over which the caliper 20 slides. The sleeve 15a is a hollow tube with a substantially circular cross-sectional profile. The head of the central bore of the sleeve 15a is stepped so that the bolt 14a is able to hold the sleeve in place when tightened on to the carrier 30.

The bore 12a of the first guide assembly 10a is an elongate hole extending from a first side (inboard) 24 to a second side 26 (outboard) of the caliper housing 22; see FIG. 2. The caliper 20 is slidably mounted with respect to the brake carrier 30 by sliding the guide pin 11a through the bore 12a. Hence, when the disc brake is actuated, the caliper 20 is able to slide in the axial direction A-A along the guide pin 11a.

The bush 13a is configured to form a close fit with the bore 12a and act as an inner liner in the bore 12a. For heavy vehicle applications the internal diameter of the bush is typically in a range of 25-40 mm. As can be seen in FIG. 2, the bush 13a does not extend the full depth of the bore 12a.

The bush 13a may be manufactured from steel, bronze, plastic, rubber or a composite of any of these, and may include a low friction coating such as PTFE. The bush 13a may have a plain inner surface or a suitable pattern of depressions to assist in the sliding of the caliper and the retention of lubricants. A convoluted bellows type seal 17 (see FIG. 2) encircles the guide pin 11a and connects to the carrier 30 and caliper 20 to protect the guide assembly 10a from contamination.

In order to inhibit the contamination of the caliper guide assembly 10a with foreign matter, a cap or cover 60a is secured the inboard end of the bore 12a. The cap 60a is formed from metal and press fitted into the end of the bore 12a. However, in alternative embodiments (not shown), the cap 60a may be partially or wholly formed from a different material such as a plastics material for example.

In the illustrated embodiment, the cap 60a comprises an end wall 64a that has a circular end face to close off the bore 12a and a skirt portion 80a arranged to extend inboard and frictionally engage the surface of the bore 12a.

With particular reference to FIGS. 3 and 4, a sensor arrangement 62a of the present teachings will now be discussed in more detail.

The guide pin 11a includes a cavity 82a at the inboard free end of the guide pin 11a, proximate the cap 60a. The cavity 82a is defined by a fastener head 83a of the fastener 14a and the inner surface 91a of the inboard end of the guide sleeve 15a; hereinafter referred to as the guide sleeve inner surface 91a. The cap 60a is secured to the open end of the guide bore 12a that is proximate the inboard free end of the guide pin 11a. The cavity 82a provides space for the sensor arrangement 62a, as will be discussed more below.

The sensor arrangement 62a includes a first sensor component 84a and a second sensor component 85a. As illustrated in FIGS. 3 and 4, the first sensor component 84a is spaced from the second sensor component 85a in a radial direction; i.e., a direction perpendicular to the axial direction A-A.

The first sensor component 84a is secured to the guide pin 11a and is at least partially located within the cavity 82a. In the illustrated embodiment, the first sensor component 84a is an elongate metallic or magnetic element that is aligned with the axial direction A-A.

The second sensor component 85a is secured to the cap 60a such that it is located within the guide bore 12a and is spaced from the end wall 64a along the axial direction A-A. As such, the second sensor component 85a is spaced from the inboard open end of the guide bore 12a along the axial direction A-A.

In the illustrated embodiment, the second sensor component 85a has a smaller axial length than the first sensor component 84a and is a Hall Effect type sensor. The second sensor component 85a includes a printed circuit board (PCB), not shown, that may aid in processing and/or transmitting sensed data. In other embodiments the PCB may be located remotely from the sensor component 85a, e.g., mounted to or embedded within the end wall 64a of the cap 60a.

As can be seen in FIGS. 3 and 4, the cap 60a includes a shaft 93a extending from the end wall 64a into the guide bore 12a in the axial direction A-A. As such, the shaft 93a is aligned parallel to the first sensor component 84a. The shaft 93a has an end portion having a free end, where the end portion is distal relative to the end wall 64a. The second sensor component 85a is located on the end portion of the shaft 93a.

The shaft 93a allows the second sensor component 85a to be sufficiently axially spaced from the inboard open end of the guide bore 12a in order to sense the full range of relative axial displacement between the first 84a and the second 85a sensor components across all brake pad wear conditions, as will be discussed more below.

The sensor arrangement 62a is configured to provide an output indicative of a relative displacement along the axial direction A-A between the first sensor component 84a and the second sensor component 85a. Since the first sensor component 84a is secured to the guide pin 11a and the second sensor component 85a is secured to the cap 60a, which is secured to the inboard open end of the guide bore 12a, the relative axial displacement between the first 84a and second 58a sensor components is indicative of the relative axial displacement between the guide pin 11a and the guide bore 12a. As such, the sensor arrangement 62a is configured to determine the relative axial displacement of the guide pin 11a and the guide bore 12a.

As the friction material of the brake pads 50a, 50b wears away during usage of the disc brake 8, the relative position of the guide pin 11a and the guide bore 12a changes. As such, the relative position of the first sensor component 84a and the second sensor component 85a changes. This may be seen by comparing the relative axial displacement x1 between the first sensor component 84a and the second sensor component 85a in FIG. 3 in which the friction material on the brake pads 50a, 50b is unworn, with the relative axial displacement x2 in FIG. 4 in which the friction material is substantially fully worn and the second sensor component 85a has moved inboard by a distance equivalent to the cumulative wear of the friction material of the outboard pad 50b and any additional wear of material from the outboard face of the rotor 40.

Since the first sensor component 84a and the shaft 93a are both aligned within the axial direction A-A, the distance between the first 84a and the second 85a sensor components in the radial direction is constant regardless of the relative displacement between the guide pin 11a and the guide bore 12a in the axial direction. This helps to ensure that the relative axial displacement between the first 84a and the second 85a sensor components as determined by the sensor arrangement 62a is accurate for all brake wear conditions; particularly when the second sensor component 85a is a Hall Effect type sensor.

The end wall 64a of the cap 60a also mounts a connector portion 70a of the wear sensor arrangement 62a on an inboard face of the end wall 64a. The connector portion 70a provides a suitable connector such as a plug or socket for a cable that is arranged to extend to the vehicle (not shown) in which the disc brake is fitted (or a lead terminating in a plug or socket remote from the cap 60a). This enables the vehicle to provide an indication to a vehicle operator of the state of wear of the brake pads 50a and 50b, e.g., via a display on a dashboard of the vehicle, or some other form of audio/visual indicator.

A protective housing 86a is secured to the guide pin 11a and is at least partially located within the cavity 82a. In particular, the protective housing 86a is secured to the fastener head 83a, as will be discussed in more detail below.

In the illustrated embodiment, the protective housing 86a is formed from a plastics material. A plastics material is may help to electrically insulate the sensor arrangement 62a from metallic components within the guide bore 12a. However, in alternative embodiments (not shown), the protective housing 86a may be formed from a metallic material such as steel or any other suitable material.

The protective housing 86a includes a void 87a having an axial depth defined along the axial direction A-A. As can be seen in FIGS. 3 and 4, the first sensor component 84a is secured to the protective housing 86a and is at least partially located within the void 87a.

In FIGS. 3 and 4, the second sensor component 85a is also at least partially located within the void 87a. However, it will be appreciated that the second sensor component 85a may not be located within the void 87a if the relative axial distance between the guide pin 11a and the end wall 64a of the cap 60a was to increase further relative to the arrangement shown in FIG. 4.

In the illustrated embodiment, the protective housing 86a is formed from a base 88a and a protective wall 89a extending from the base 88a in the axial direction A-A towards the inboard open end of the guide bore 12a.

The first sensor component 84a is secured to and extends from the base 88a towards the inboard open end of the guide bore 12a in the axial direction A-A. The first sensor component 84a may be secured to the base 88a via any suitable means, such as gluing, overmolding or via an interference fit for example.

The base 88a is secured to the fastener head 83a. In the illustrated embodiment, the base 88a is secured to the fastener head 83a via a threaded fastener 90a that is received within a threaded recess in the base 88a and a threaded recess in the fastener head 83a. However, it will be appreciated that the base 88a may be secured to the fastener head 83a via any suitable means, such as gluing, overmolding, welding (when both the base 88a and the fastener head 83a are formed from a metallic material) or press-fitting for example.

Since the first sensor component 84a is secured to the base 88a, which in turn is secured to the fastener head 83a, the first sensor component 84a is secured to the fastener head 83a. However, it will be appreciated that in alternative embodiments (not shown), the first sensor component 84a may be secured to the fastener head 83a directly. In such embodiments, the protective housing 86a may not include a base 88a or may include a base 88a comprising an aperture adjacent the fastener head 83a in which the first sensor component 84a is at least partially received.

In alternative embodiments (not shown), the protective housing 86a may instead be secured to the guide sleeve inner surface 91a. For example, the base 88a may be secured to the guide sleeve inner surface 91a via any means previously described.

The protective wall 89a is a continuous wall with a circular cross-sectional profile along the axial direction A-A. The protective wall 89a surrounds at least the first sensor component 84a in the radial direction and therefore provides protection to at least the first sensor component 84a from damage that may be caused by other components in the guide bore 12a as well as from external contaminants.

In the illustrated embodiment, the void 87a is defined by the base 88a and the protective wall 89a. As such, the axial depth of the void 87a is substantially equal to the axial length of the protective wall 89a; i.e., the length of the protective wall 89a in the axial direction A-A. However, it will be appreciated that in alternative embodiments (not shown), the protective housing 86a may not include the base 88a or the base 88a may include an aperture. In such embodiments, the void 87a may be partially defined by the fastener head 83a.

In embodiments in which the protective housing 86a does not include the base 88a (not shown), the protective wall 89a may be secured directly to the fastener head 83a via any of the means previously described.

In the illustrated embodiment, the first sensor component 84a has an axial length (i.e., a length aligned with the axial direction A-A) that is substantially equal to the axial depth of the void 87a. As such, an inboard free end of the first sensor component 84a is substantially level with an inboard end of the protective wall 89a.

The shaft 93a has an axial length that is greater than the axial depth of the void 87a. As such, the free end of the shaft 93a is received in a cavity in the base 88a of the protective housing 86a when the protective wall 89a is adjacent the cap 60a, as shown in FIG. 3. The second sensor component 85a is located on the shaft 93a such that it does not enter said cavity in any brake pad wear condition.

However, in alternative embodiments (not shown) the shaft 93a may have an axial length that is substantially equal to the axial depth of the void 87a.

Advantageously, since the axial length of the first sensor component 84a is substantially equal to the axial depth of the void 87a, the relative axial displacement that the wear sensor arrangement 62a can sense (i.e., the relative positions of the first 84a and second 85a sensor components) may be maximized. Further, the first sensor component 84a is afforded protection by the protective wall 89a when its axial length is less than or equal to the axial depth of the void 87a.

The cap 60a includes a guide wall 81a that extends from the end wall 64a into the guide bore 12a in the axial direction A-A. The guide wall 81a is a continuous wall with a circular cross-sectional profile that is shaped such that the guide wall 81a receives an outer surface of the protective wall 89a and such that the guide wall 81a is received with the guide sleeve inner surface 91a. In this arrangement, the guide wall 81a is at least partially adjacent the outer surface of the protective wall 89a and the guide sleeve inner surface 91a.

In the illustrated embodiment, the guide wall 81a, the protective wall 89a and the guide sleeve inner surface 91a all have circular cross-sections along the axial direction A-A. However, it will be appreciated that in alternative embodiments (not shown), the guide wall 81a, the protective wall 89a and the guide sleeve inner surface 91a may all have square cross-sections for example, or corresponding cross-sections of any suitable shape.

As can be seen in FIGS. 3 and 4, the protective wall 89a, the end wall 64a, the guide wall 81a and the base 88a define an enclosed space 92a within which the first sensor component 84a and the second sensor component 85a are wholly contained. By enclosed space, it is meant a space surrounded in all directions by walls or barriers.

Advantageously, the enclosed space 92a helps to prevent other components that may be present within the guide bore 12a as well as external environmental contaminants from contacting and potentially damaging the first 84a and second 85a sensor components.

It will be appreciated that in alternative embodiments (not shown) in which the protective housing 86a does not include the base 88a or the base 88a includes an aperture, the enclosed space 92a may be partially defined by the fastener head 83a.

By comparing FIGS. 3 and 4, it can be seen that both the guide sleeve inner surface 91a and the protective wall 89a are able to translate relative to the guide wall 81a. The axial lengths of the protective wall 89a and the guide wall 81a are such that the protective wall 89a remains partially received within the guide wall 81a in the fully worn brake pad condition shown in FIG. 4. Hence, the overlap of the guide wall 81a and the protective wall 89a in all brake pad conditions maintains the enclosed space 92a. As such, the first 84a and second 85a sensor components remain protected throughout all wear conditions of the brake pads.

The guide wall 81a, the guide sleeve inner surface 91a, the end wall 64a and the fastener head 83a also define an enclosed space within which both the first 84a and second 85a sensor components are wholly contained. In alternative embodiments (not shown), the caliper guide assembly 10a may not include a protective housing 86a. Therefore, in such embodiments, an enclosed space may still exist to protect the sensor arrangement 62a from other components within the guide bore 12a as well as from external contaminants.

The shaft 93a, the guide wall 81a and the end wall 64a of the cap 60a may be formed as a unitary structure via a molding process for example. Alternatively, the shaft 93a and/or the guide wall 81a may be formed separately to the end wall 64a and subsequently secured to the end wall 64a via any suitable means, such as gluing or welding for example.

As illustrated in FIGS. 3 and 4, the first sensor component 84a, the shaft 93a and therefore the second sensor component 85a are located substantially centrally with respect to the guide bore 12a. This helps to ensure that the first 84a and second 85a sensor components are located away from other components within the guide bore 12a and the guide pin 11a, and hence may inhibit damage from occurring to the sensor components, as well as minimizing possible interference from such components that has an adverse effect on sensing accuracy.

However, in alternative embodiments (not shown), the first sensor component 84a and/or the second sensor component 85a may not be located centrally with respect to the guide bore 12a. For example, one or both sensor components 84a, 85a may be located adjacent the protective wall 89a for example.

In alternative embodiments (not shown), the first sensor component 84a may instead be secured to or embedded in the protective wall 89a, via gluing or overmolding for example.

In alternative embodiments (not shown), the second sensor component 85a may instead be secured to or embedded in the guide wall 81a, via gluing or overmolding for example. In such embodiments, the second sensor component 85a may be secured to the outboard end of the guide wall 81a and the cap 60a may not include the shaft 93a.

In alternative embodiments (not shown), the first sensor component 84a may be a Hall Effect type sensor and the second sensor component 85a may be a metallic or magnetic element.

In alternative embodiments (not shown), the second sensor component 85a may be an optical sensor and the first sensor component 84a may include markings visible to the optical sensor to indicate relative axial displacement.

In alternative embodiments (not shown), a shaft, similar to the shaft 93a secured to the cap 60a, may be secured to the guide pin 11a and the second sensor component 85a may be secured to said shaft. Further, the first sensor component 84a may be secured to the cap 60a.

It will be appreciated that by at least partially locating the sensor arrangement 62a within the cavity 82a in the guide pin 11a, the caliper guide assembly 10a may be more compact relative to conventional guide assemblies which include wear sensing components outside of the guide pin. It will also be appreciated that the sensor arrangement 62a of the present caliper guide assembly 10a is better protected from other components and external contaminants relative to said conventional guide assemblies.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A caliper guide assembly comprising:
   a guide pin having a cavity at a free end thereof;
   a guide bore arranged to receive the guide pin and permit relative axial sliding thereof;
   a cap secured to an open end of the guide bore that is proximate the free end of the guide pin; and
   a sensor arrangement including a first sensor component radially spaced from a second sensor component, the first sensor component secured to the guide pin such that the first sensor component is at least partially located within the cavity, the second sensor component secured to the cap such that the second sensor component is located within the guide bore and is axially spaced from the open end of the guide bore, wherein the sensor arrangement is configured to provide an output indicative of a relative axial displacement between the first sensor component and the second sensor component.

2. The caliper guide assembly of claim 1 further comprising a protective housing secured to the guide pin and at least partially located within the cavity, wherein the protective housing comprises a void having an axial depth within which the first sensor component is at least partially located.

3. The caliper guide assembly of claim 2 wherein the first sensor component is secured to the protective housing.

4. The caliper guide assembly of claim 3 wherein the protective housing comprises a base, the void at least partially defined by the base, and wherein the first sensor component is secured to and extends from the base.

5. The caliper guide assembly of claim 2 wherein the protective housing comprises an axially extending protective wall, and wherein the void is at least partially defined by the protective wall.

6. The caliper guide assembly of claim 2 wherein the first sensor component has an axial length substantially equal to the axial depth of the void.

7. The caliper guide assembly of claim 1 wherein the cap comprises a shaft extending axially into the guide bore, the shaft having an end portion having a free end, wherein the second sensor component is located on the shaft.

8. The caliper guide assembly of claim 7 wherein the second sensor component is disposed proximate the free end of the shaft.

9. The caliper guide assembly of claim 7 further comprising a protective housing secured to the guide pin and at least partially located within the cavity, wherein the protective housing comprises a void having an axial depth within which the first sensor component is at least partially located, wherein the shaft has an axial length greater than or equal to the axial depth of the void.

10. The caliper guide assembly of claim 1 wherein the cap comprises a guide wall and an end wall, wherein the guide wall extends axially from the end wall into the guide bore, and wherein the guide wall is at least partially adjacent an inner surface of the guide pin adjacent the cavity.

11. The caliper guide assembly of claim 10 wherein the guide wall, the end wall, and the inner surface of the guide pin adjacent the cavity at least partially define an enclosed space within which the first and second sensor components are wholly contained.

12. The caliper guide assembly of claim 10 further comprising a protective housing secured to the guide pin and at least partially located within the cavity, wherein the protective housing comprises a void having an axial depth within which the first sensor component is at least partially located, wherein the protective housing, the end wall, and the guide wall at least partially define an enclosed space within which the first and second sensor components are wholly contained.

13. The caliper guide assembly of claim 12 wherein the guide wall is at least partially located between the protective housing and the inner surface of the guide pin adjacent the cavity.

14. The caliper guide assembly of claim 1 wherein the first and second sensor components are located substantially centrally with respect to the guide bore.

15. The caliper guide assembly of claim 1 wherein the first sensor component is a metallic or magnetic element and the second sensor component is a Hall Effect type sensor.

* * * * *